United States Patent
Lee et al.

(10) Patent No.: US 7,593,754 B2
(45) Date of Patent: Sep. 22, 2009

(54) RECEIVING APPARATUS AND RECEIVING METHOD OF COMMUNICATION SYSTEM WITH MULTIPLE ANTENNAS

(75) Inventors: Young-Ha Lee, Daejeon (KR); Youn-Ok Park, Daejeon (KR)

(73) Assignees: Samsung Electronics Co., Ltd. (KR); Electronics & Telecommunications Research Institute (KR); Hanaro Telecom, Inc. (KR); SK Telecom Co., Ltd. (KR); KT Corporation (KR)

( * ) Notice: Subject to any disclaimer, the term of this patent is extended or adjusted under 35 U.S.C. 154(b) by 462 days.

(21) Appl. No.: 11/635,715

(22) Filed: Dec. 7, 2006

(65) Prior Publication Data

US 2007/0155352 A1 Jul. 5, 2007

(30) Foreign Application Priority Data

Dec. 8, 2005 (KR) .................. 11-2005-0119984

(51) Int. Cl.
*H04M 1/00* (2006.01)
*H04Q 7/20* (2006.01)

(52) U.S. Cl. .................. 455/562.1; 455/272; 370/208; 370/210; 370/334

(58) Field of Classification Search .................. 455/272, 455/562.1; 370/208, 210, 334
See application file for complete search history.

(56) References Cited

U.S. PATENT DOCUMENTS 6,952,394 B1 * 10/2005 Kim et al. .................. 370/208

2004/0257980 A1 * 12/2004 Yeh et al. .................. 370/210
2005/0078649 A1    4/2005 Tehrani et al.
2005/0094740 A1 *  5/2005 Borran et al. ............ 375/267

OTHER PUBLICATIONS

Shinsuke Hara et al., A Pre-FFT OFDM Adaptive Antenna Array with Eigenvector Combining, IEEE Communications Society, 2004, pp. 2412-2416.

* cited by examiner

*Primary Examiner*—Lee Nguyen
(74) *Attorney, Agent, or Firm*—The Farrell Law Firm, LLP

(57) ABSTRACT

A receiving method and apparatus of an orthogonal frequency division multiplexing access system having multiple antennas that is capable of improving system design and realization of integration degree by reducing complexity of fast Fourier transform (FFT) and noncoherent combination is provided. The receiving apparatus of a communication system having multiple antennas includes a parallel/series converter for converting data received according to each receiving path from parallel to series data; a fast Fourier transform (FFT) unit for fast Fourier transforming the data converted from parallel to series data; a series/parallel converter for converting the fast Fourier transformed series data from series to parallel data; a series noncoherent combiner for noncoherently combining the fast Fourier transformed series data and outputting the noncoherent combined data; a channel estimator/compensator for channel-estimating/compensating the data converted to parallel according to respective receiving paths; and a coherent combiner for coherently combining the channel-estimated/compensated data and for outputting the coherent combined data.

10 Claims, 8 Drawing Sheets

RECEIVING APPARATUS AND RECEIVING METHOD OF COMMUNICATION SYSTEM WITH MULTIPLE ANTENNAS

PRIORITY

This application claims priority to and the benefit of Korean Patent Application No. 10-2005-0119984 filed in the Korean Intellectual Property Office on Dec. 08, 2005, the entire contents of which are incorporated herein by reference.

BACKGROUND OF THE INVENTION (a) Field of the Invention

The present invention relates to a receiving method and a receiving apparatus of a communication system having multiple antennas. More particularly, the present invention relates to a receiving method and a receiving apparatus of an orthogonal frequency division multiplexing access (OFDMA) system.

(b) Description of the Related Art

A basic principle of an orthogonal frequency division multiplexing (OFDM) system is that input data of a high data rate are arranged in parallel by the number of carriers as data of a low data rate and are transmitted on each carrier. At this time, since symbol blocks of subcarriers of a low data rate are increased, a relative distortion on a time phase is decreased due to a multipath delay spread, and longer guard intervals than a channel delay speed are inserted between all the OFDM symbols so that inter-symbol interference may be removed.

Since such an OFDM modulation/demodulation uses a plurality of subcarriers, it is difficult to design hardware as the number of subcarriers has been increased. In addition, it is difficult to maintain orthogonality between subcarriers and to realize it in an actual system. Discrete Fourier transform (DFT) may solve such problems, and many DFT operations may be decreased by using a fast Fourier transform (FFT).

Such an FFT is performed by continuously disintegrating DFT of a length N by DFT of a smaller length in time decimation or frequency decimation. In this manner, the number of multiplications among the operations of DFT is decreased from N2 times to NlogN times. For efficient operation of such an FFT, Radix-2 DIT (decimation in time) FFT and DIF (decimation in frequency) FFT, Radix-4 DIT FFT and DIF FFT, and Radix-$2^2$ DIT FFT and DIF FFT are used.

Meanwhile, an OFDM transmission method of a multiple antenna system may include a MIMO (multiple-input multiple-output) method such as using a smart antenna for performing beam forming according to a structure of the multiple antennas. Various analyses have been performed, for example a post-FFT in which FFT is performed for the respective antennas and then a weight value (weight factor) is multiplied, and a pre-FFT in which the weight values are multiplied and combined in a time domain and then one FFT is performed.

However, since a multiple access scheme using the OFDMA is structured such that an entirely-used subcarrier is allocated as each subscriber unit and transmitted as each subscriber unit, it may be not used for the pre-FFT in which the weight values are multiplied in a time domain.

Meanwhile, a multiple antenna receiver for the conventional wideband wireless communication performs FFT as many times as the number of antennas on the OFDM transmission using the multiple antennas. At this time, the FFT is performed as many times as the number of antennas after discovering a combined time synchronization and frequency synchronization using each received signal. In addition, after the FFT is performed, a channel is estimated and a weight value is calculated and combined using pilots of each received signal path and band.

That is, when performing an FFT for the respective antennas, the time synchronization and frequency synchronization as important factors of the performing of FFT are not obtained for the respective antenna receiving paths, but the FFT is performed for the respective antenna receiving paths after obtaining the time synchronization and frequency synchronization by combining the same.

In other words, the OFDMA demodulation may be realized by FFT, and the OFDMA performs FFT for each antenna in the multiple antenna system so that a signal of a subscriber station of an uplink may be recovered. However, since FFT is performed as many times as the number of antennas when the number of antennas is increased, an FFT scheme for performing FFT for the respective antennas has a complexity-increase problem.

SUMMARY OF THE INVENTION

The present invention has been made in an effort to provide a receiving method and a receiving apparatus of an OFDMA system having multiple antennas, having advantages of reducing complexity of a receiver by realizing several FFT units as one FFT unit.

In addition, the present invention has been made in an effort to provide a receiving method and a receiving apparatus of an OFDMA system having multiple antennas, having advantages of providing a simple noncoherent combination structure in correspondence to a decrease in a number of FFT units.

The technical object of the present invention may not be limited to the above-noted technical object, and a person of ordinary skill in the art may understand other technical objects not noted.

An exemplary embodiment of the present invention provides a receiving apparatus of a communication system having multiple antennas, including a parallel/series converter for converting data received according to each receiving path from parallel to series data; a fast Fourier transform (FFT) unit for performing a fast Fourier transform (FFT) of the data converted from parallel to series data; a series/parallel converter for converting the FFT-performed series data from series to parallel data; a series noncoherent combiner for noncoherently combining the FFT-performed series data and outputting the noncoherent combined data; a channel estimator/compensator for channel-estimating/compensating the data converted to parallel data according to the respective receiving paths; and a coherent combiner for coherently combining the channel-estimated/compensated data and for outputting the coherent combined data.

The fast Fourier transform (FFT) unit may use a pipeline structure, and it may have a transmission speed and a memory size corresponding to the number of multiple antennas.

The series noncoherent combiner may use one addition unit and one delay unit regardless of the number of antennas.

The series noncoherent combiner may include an addition unit for receiving a series input signal as an output of the FFT though a first input end and a delay signal through a second input end and adding the same, and outputting the combined output signal; and a delay unit for delaying an output of the addition unit according to a parallel sampling signal and inputting the delayed data to the second input end of the addition unit. The delay unit may be a flip-flop.

Another exemplary embodiment of the present invention provides a receiving method of a communication system having multiple antennas, including: respectively receiving data according to each receiving path though multiple antennas; converting each received data from parallel to series data; performing a fast Fourier transform (FFT) of the series-converted data; converting the FFT-performed data from series to parallel data; channel-estimating and compensating each parallel-converted data according to the receiving path; and coherently combining the channel-estimated and compensated data and outputting the coherent-combined data.

When converting the FFT-performed data from series to parallel data, the FFT-performed data may have a transmission speed and a memory size corresponding to the number of multiple antennas.

The receiving method of the OFDMA system having the multiple antennas according to an exemplary embodiment of the present invention may further include noncoherently combining the series fast Fourier transformed data and outputting the noncoherently combined data.

One addition unit and one delay unit, regardless of the number of multiple antennas, may perform the noncoherently combining and outputting of the series fast Fourier transformed data.

DETAILED DESCRIPTION OF THE EMBODIMENTS

Figure 1:
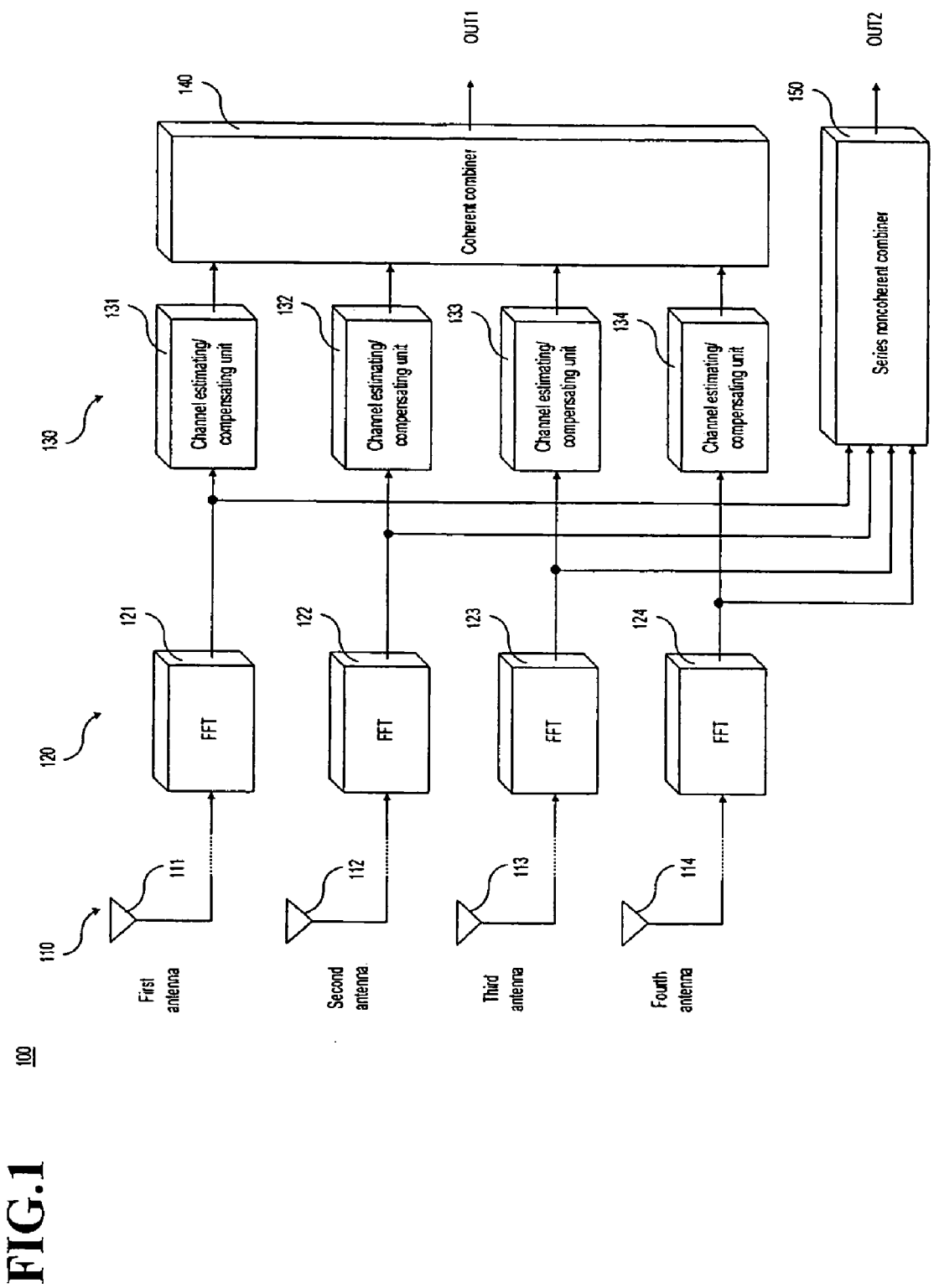
FIG. 1 is a schematic block diagram of an OFDMA receiver having four antennas.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Hereinafter, a receiving method and receiving apparatus of a communication system having multiple antennas is described in detail.

According to an exemplary embodiment of the present invention, a communication system is described as an orthogonal frequency division multiplexing access (OFDMA) system using an array antenna system (AAS), which is defined in a wireless access standard for a wireless MAN-OFDMA physical layer of, for example, the IEEE 802.16e standard.

According to an exemplary embodiment of the present invention, a communication system of a multiple antenna scheme may be provided with a fast Fourier transform (FFT) unit efficiently designed considering complexity, and accordingly, it may be provided with an optimum noncoherent combination structure.

First, an OFDMA receiver according to an exemplary embodiment of the present invention is described.

The OFDMA transmission method uses a signal allocated to orthogonal subcarriers as a different subchannel unit for each user and mapped in a frequency domain that is converted in a time domain, the converted signal is transmitted and is again converted in the frequency domain, and the subchannel of the subscriber is recovered. Such an OFDMA transmission is realized using FFT, where a general multiple antenna system uses FFT for the respective antenna receiving paths and performs a compensation for the receiving paths.

FIG. 1 is a schematic block diagram of an OFDMA receiver having four antennas, which shows a basic concept of a coherent combination with the FFT and a noncoherent combination with the FFT in an OFDMA receiver having four antennas.

Referring to FIG. 1, the OFDMA receiver 100 includes a multiple antenna 110, an FFT unit 120, a channel estimating/compensating unit 130, a coherent combiner 140, and a series noncoherent combiner 150.

When the OFDMA receiver has four receiving antennas, the multiple antenna 110 respectively receives data though first to fourth receiving antennas 111, 112,113, and 114, and each of FFT units 121, 122, 123, and 124 performs a fast Fourier transform (FFT) of the received data for respective receiving paths of the receiving antennas 111, 112, 113, and 114.

Each of channel estimating and compensating units 131, 132, 133, and 134 performs channel-estimating and compensating of outputs of respective FFT units 121, 122, 123, and 124 for the receiving paths, and the coherent combiner 140 performs a coherent combination. In addition, the series noncoherent combiner 150 performs an equal gain combination so as to perform a noncoherent combination of the output of the FFT units 121, 122, 123, and 124.

A channel estimate for the coherent combination means that each channel is estimated and compensated by a weight value of a subscriber channel state of the receiving path and the estimated and compensated channels are then combined.

In addition, the noncoherent combination is performed when the channel environment of the receiving path and the channel environment of the subscriber may not be known. At this time, the noncoherent combination may be performed in a time domain, but in this case, the coherent combination may not be performed, and accordingly additional FFT is desired for the coherent combination.

Therefore, so as to perform the coherent combination, as shown in FIG. 1, the OFDMA transmission method of the multiple antenna system performs FFT for each of the respective receiving antennas.

Figure 2A:
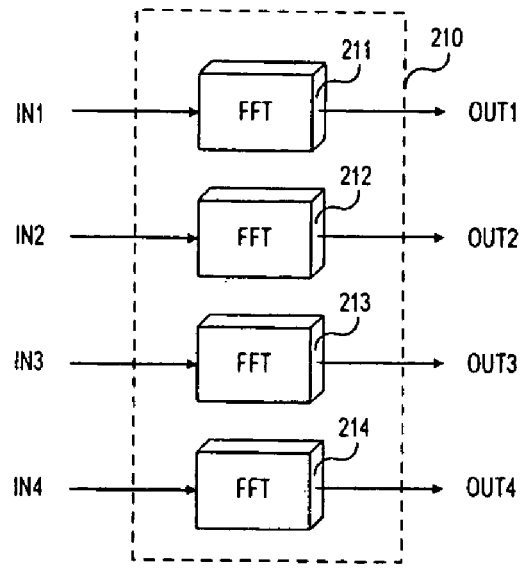
FIG. 2A illustrates four FFTs and FIG. 2B illustrates that four FFTs are realized as one FFT by arranging the four FFTs in parallel/series and in series/parallel.
Figure 2B:
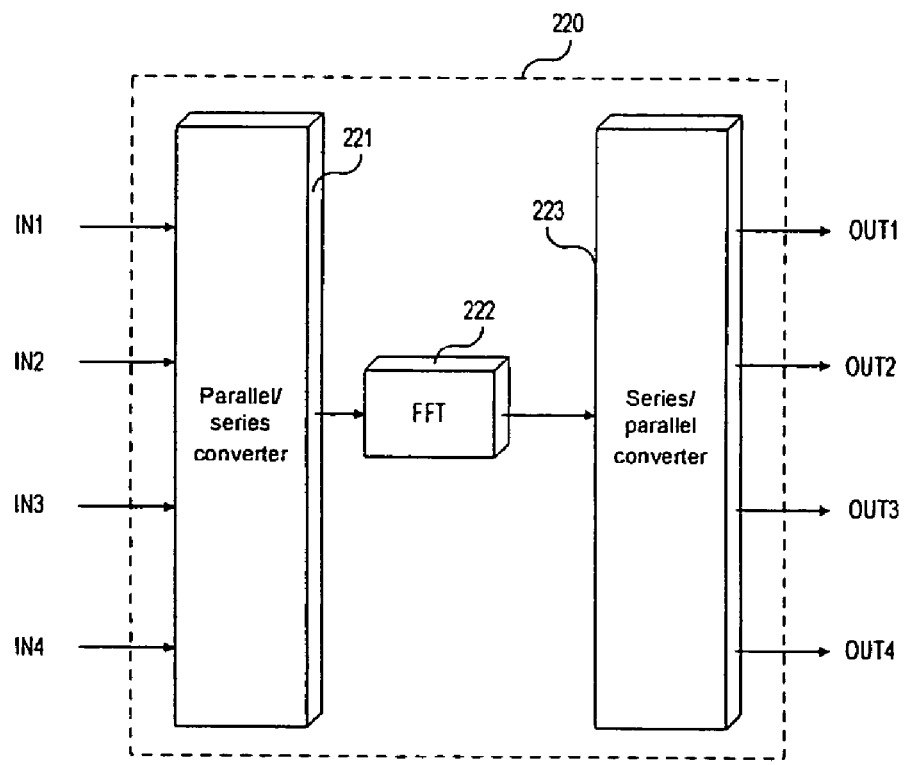

FIG. 2A illustrates four FFTs and FIG. 2B illustrates that four FFTs are performed by one FFT by arranging the four FFTs in parallel/series and in series/parallel.

As shown in FIG. 2A, data IN1, IN2, IN3, and IN4 input from the receiving antennas are respectively outputted as output data OUT1, OUT2, OUT3, and OUT4 after they are fast Fourier transformed by the FFT unit 210 a number of times corresponding to the number of receiving antennas, that is, by the FFT units 211, 212, 213, and 214.

According to an exemplary embodiment of the present invention, when the FFT is designed as a pipeline structure, as shown in FIG. 2B, one FFT unit 220 using a parallel/series transformation and series/parallel transformation may be realized.

That is, the input data IN1, IN2, IN3, and IN4 are transformed to series data by the parallel/series converter 221, the series data is fast Fourier transformed by one FFT unit 222, and the fast Fourier transformed series data may be outputted as parallel data, that is, output data OUT1, OUT2, OUT3, and OUT4, by the series/parallel converter 223.

Figure 3:
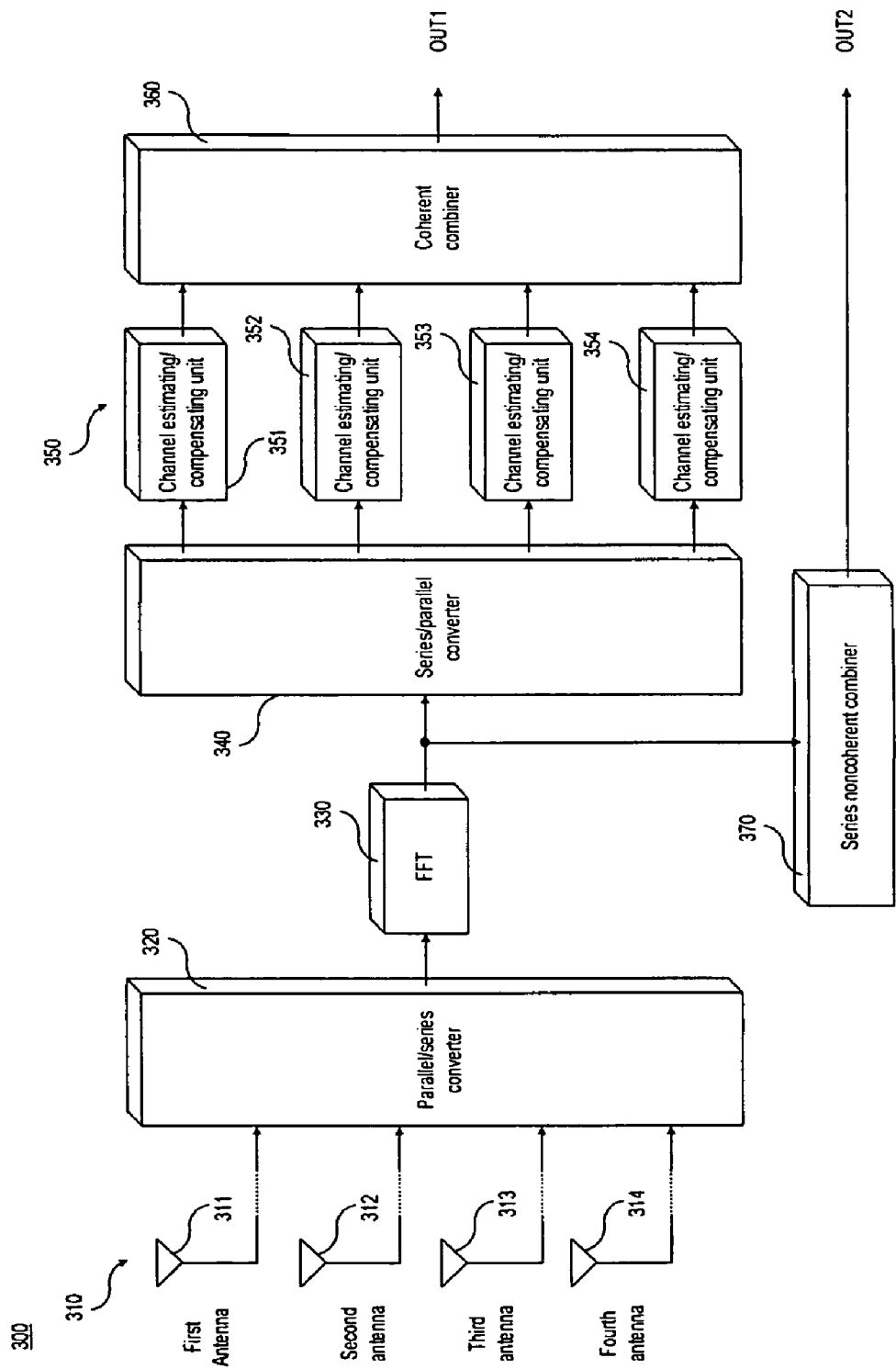
FIG. 3 is a schematic diagram of a receiving apparatus of an orthogonal frequency division multiplexing access system having multiple antennas according to an exemplary embodiment of the present invention.

FIG. 3 is a schematic diagram of a receiving apparatus of an orthogonal frequency division multiplexing access system having multiple antennas according to an exemplary embodiment of the present invention, in which an OFDMA receiver having four antennas realizes a coherent combination and a noncoherent combination by one FFT unit shown in FIG. 2B.

Referring to FIG. 3, a receiving apparatus of an OFDMA system 300 having a multiple antenna according to an exemplary embodiment of the present invention includes a multiple antenna 310, a parallel/series converter 320, an FFT unit 330, a series/parallel converter 340, a channel estimating/compensating unit 350, a coherent combiner 360, and a series noncoherent combiner 370.

When the OFDMA system 300 has four antennas 311, 312, 313, and 314 according to an exemplary embodiment of the present invention, the parallel/series converter 320 performs a parallel/series transformation of the data received though the receiving paths of the four receiving antennas 311, 312, 313, and 314.

The FFT unit 330 performs FFT of the data converted to series by the parallel/series converter 320.

OFDM converts series data to be transmitted into parallel data and then transmits each parallel data on a plurality of subcarriers, where orthogonality is provided between the subcarriers. This may significantly reduce the bandwidth used in comparison with the frequency division-multiplexing (FDM) scheme. In addition, since the length of a symbol may be increased, it has a strong characteristic for a multipath-fading channel.

In order to realize an OFDM communication system, a plurality of oscillators and filters are desired, but they may be replaced by inverse fast Fourier transform (IFFT) and FFT units.

The FFT unit is very important to design an OFDM-based communication system, and it consumes a large amount of the power of the communication system. When the FFT unit is designed, it is important to efficiently reduce the circuit size and circuit power so as to efficiently realize the entire communication system.

The FFT unit performs an operation of complex numbers having a real part and an imaginary part in the OFDM-based communication system. In hardware, the real part and the imaginary part are separately inputted, and accordingly, the FFT unit may perform IFFT when the FFT unit is designed such that locations of the real part and the imaginary part of the input/output are converted. Such an FFT process may be realized largely by an array scheme and a pipeline scheme.

An array FFT has a very complex and large structure in terms of hardware, and accordingly it is not possible to be realized when many operation points N of the FFT are used.

Meanwhile, a pipeline FFT unit has a structure that is relatively simply controlled, and provides a series input and a series output, and accordingly it may be used for application fields requiring high performance.

The FFT may be realized in various manners, but is representatively realized by a memory-using scheme and a pipeline scheme.

The memory-using scheme repeatedly reads and processes input values stored in the memory by a number using one Radix-r processor, and again stores the same in the memory. The processed operation number is given as $(N/r)\log_r N$. Herein, N is a length to be fast Fourier transformed. Such a memory-using scheme has a merit in that it is inexpensive in terms of hardware and has low power consumption, but it has a drawback in that it has a slower processing speed than that of the pipeline scheme.

The pipeline scheme disposes several Radix-r processors in series, and inserts a buffer between each processor so that each processor simultaneously processes data, and accordingly it has a fast processing speed. The pipeline scheme uses the same numbers of operations as the memory-using scheme.

Accordingly, such a pipeline structure is appropriate for application fields wherein a short FFT process time is desired. Such application fields include a wireless local area network (WLAN), and almost all of presently standardized wireless communication systems.

Referring to FIG. 3, the series/parallel converter 340 transforms the fast Fourier transformed series data into parallel data.

The channel estimating and compensating units 351, 352, 353, and 354 perform a channel estimate and compensation of the converted parallel data for each receiving path.

The coherent combiner 360 coherently combines the channel-estimated and compensated parallel data and outputs the coherent-combined data.

In addition, the series noncoherent combiner 370 noncoherently combines the FFT-transformed series data and outputs the noncoherent combined data.

Ultimately, in such a converted structure, one FFT unit requires a data path four times faster than that of the previous FFT unit and a memory four times larger than that of the previous FFT unit, but has the same control path as that of the previous FFT unit.

That is, comparing the case of using four FFT units to the case of using one series FFT unit, the memory size is not varied, other integration degrees may be decreased, and a controller for generating a control signal may be used as it is. Accordingly, without significantly changing the FFT design, four FFT units may be realized as one FFT set by adding a parallel/series converter and a series/parallel converter.

In addition, since the coherent combination uses a channel that is estimated for each antenna receiving path and is then combined, a weight value calculation and a channel estimate of a channel state of the receiving path and subscriber are performed for each path converted from series to parallel after performing FFT. Herein, the coherent combination has the same structure as the case of using the four FFT units.

However, in the case of the noncoherent combination, since the currently existing combination is as the same gain combination without the channel estimate and compensation of the four receiving paths, for example for the four receiving paths, three addition units are used to add the same.

Figure 4:
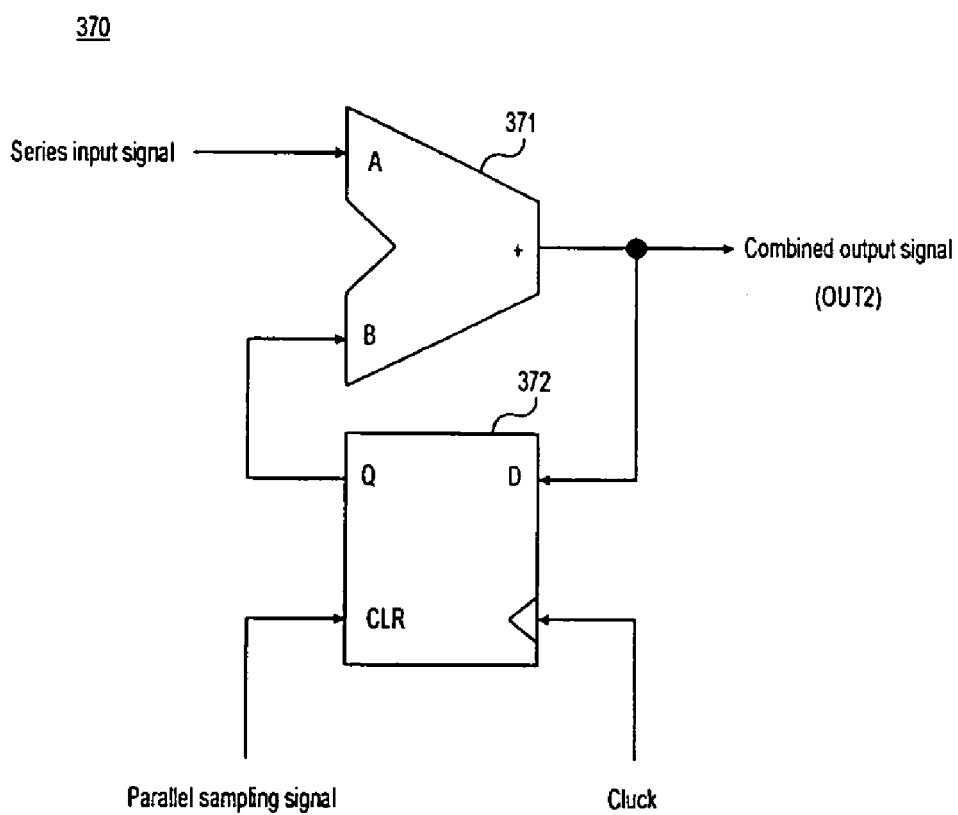
FIG. 4 is a schematic diagram of a series non-synchronized combiner of FIG. 3.

FIG. 4 is a schematic diagram of a series non-synchronized combiner of FIG. 3.

Referring to FIG. 4, the series noncoherent combiner 370 according to an exemplary embodiment of the present invention is formed with one addition unit 371 and one delay unit 372 regardless of the number of antennas.

The addition unit 371 receives the series input signal as the output of the FFT unit through a first input terminal A and a delay signal through a second input terminal B, adds the same, and outputs a combined output signal OUT2.

The delay unit 372 may be formed as a flip-flop, and it delays the output of the addition unit 371 according to a parallel sampling signal until its output is inputted through the second input end B of the addition unit 371.

According to an exemplary embodiment of the present invention, before the four receiving paths are converted from parallel to series and one FFT unit is used, and a parallel conversion is performed so as to coherently combine the series signal, a series noncoherent combination is used as shown in FIG. 4, thereby reducing complexity. This is because one addition unit and one delay unit perform the series noncoherent combination.

Although the number of addition units used for the noncoherent combination is increased as the number of antennas is increased in the currently existing multiple antenna system, a series noncoherent combination according to an exemplary embodiment of the present invention is used so that one addition unit and one delay unit may be used regardless of the number of antennas.

Figure 5:
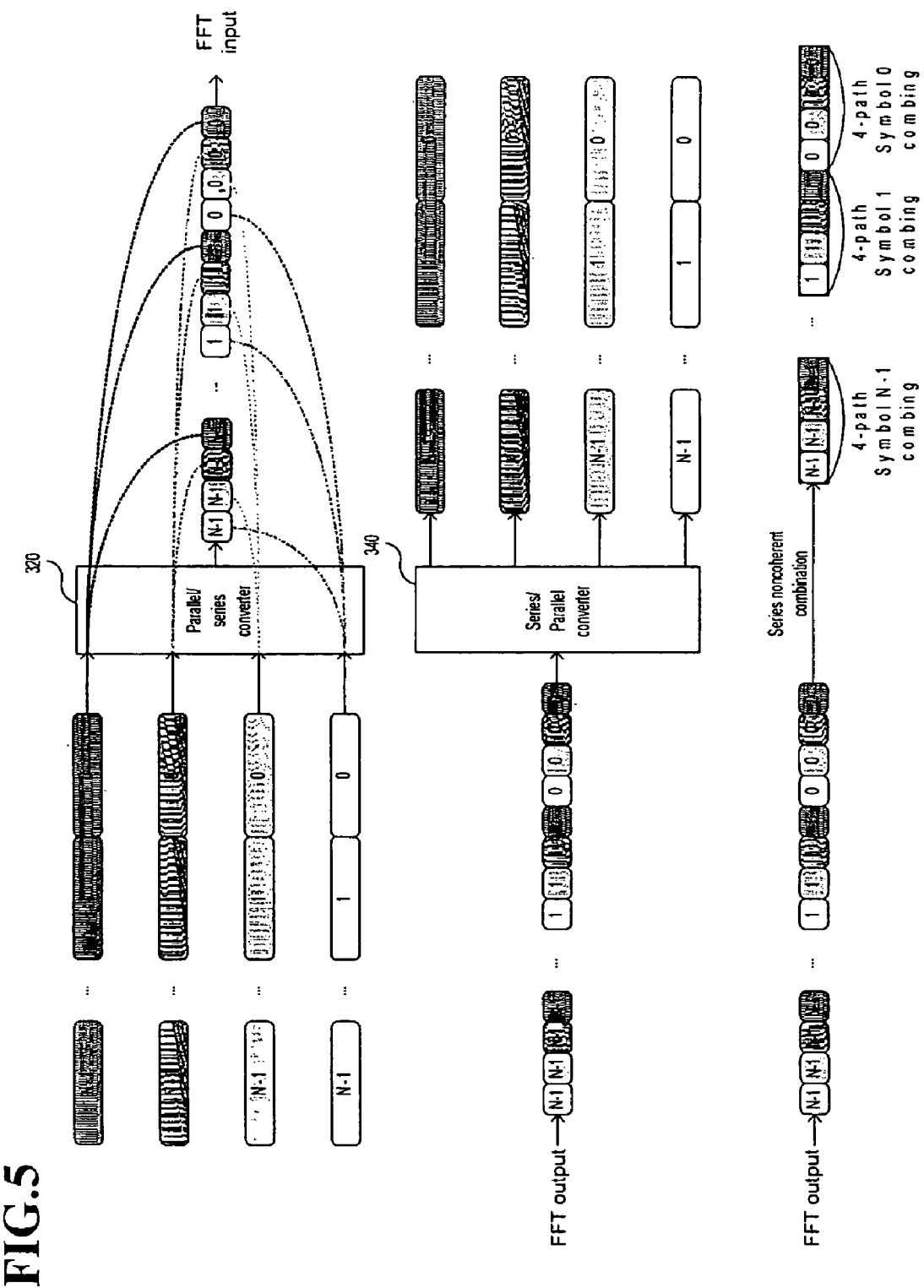
FIG. 5 illustrates a series/parallel and parallel/series transformation for performing one FFT according to an exemplary embodiment of the present invention and the parallel non-synchronized combination of FIG. 4.

FIG. 5 illustrates a series/parallel and parallel/series transformation for performing one FFT according to an exemplary embodiment of the present invention and the parallel noncoherent combination of FIG. 4.

In FIG. 5, a signal flows through the parallel/series converter 320 and the series/parallel converter 340, in which the signal is noncoherently combined in series using the series-converted signal after the FFT.

Figure 6:
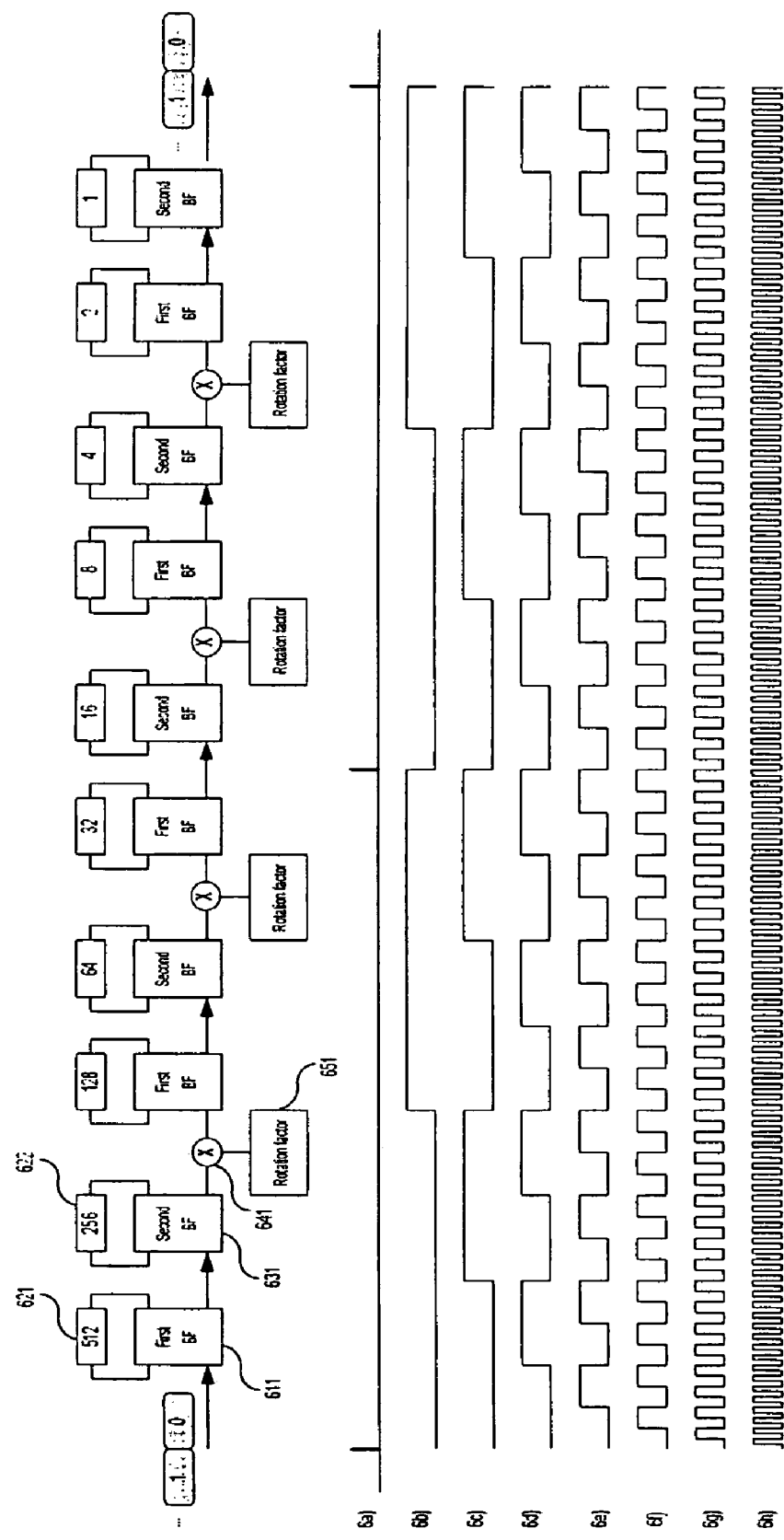
FIG. 6 illustrates a 1024-point FFT structure using a Radix-$2^2$ SDF scheme of a general pipeline structure and various control signals used for the same.
Figure 7:
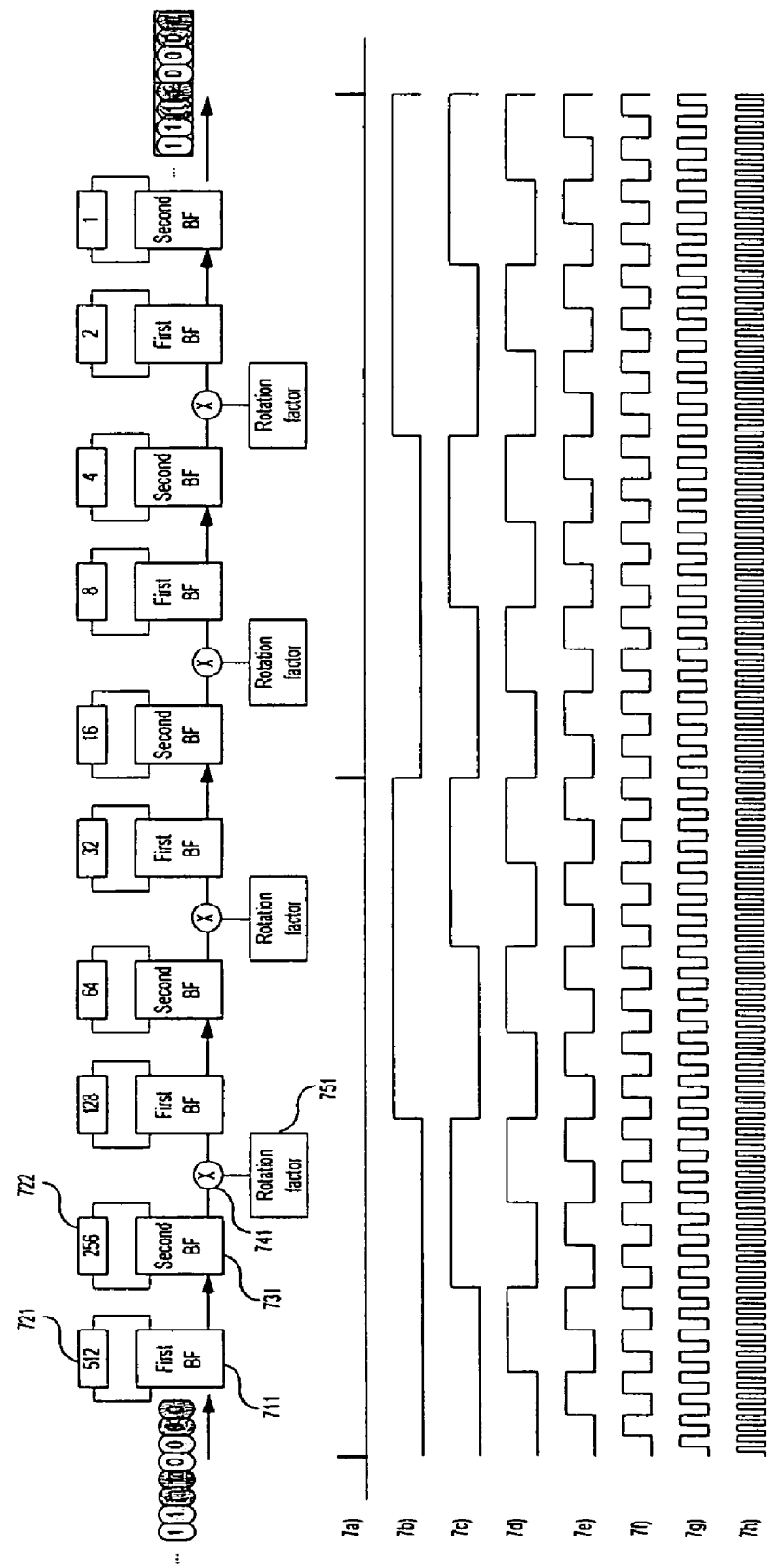
FIG. 7 illustrates a structure for performing a one FFT by series- and parallel-arranging four 1024-point FFTs using a Radix-$2^2$ SDF scheme of a pipeline structure according to an exemplary embodiment of the present invention and various control signals used for the same.

FIG. 6 illustrates a 1024-point FFT structure using a Radix-$2^2$ SDF scheme of a general pipeline structure and various control signals used for the same. FIG. 7 illustrates a structure for performing one FFT in series and in parallel with four 1024-point FFTs using a Radix-$2^2$ SDF scheme of a pipeline structure according to an exemplary embodiment of the present invention and various control signals used for the same.

According to an exemplary embodiment of the present invention, a Radix-$2^2$ SDF-(singlepath delay feedback) based FFT among the above-noted various pipeline-based FFTs may be used.

In FIG. 6, a 1024-point FFT structure and a control signal of the Radix-$2^2$ SDF—(singlepath delay feedback) based FFT are illustrated and may be changed by arranging four FFTs as one FFT in series as shown in FIG. 7.

Referring to FIG. 6, the 1024-point FFT includes butterflies (BF) 611 and 631, a complex number multiplier 641, delay units 621 and 622, and a rotation factor 651, and for convenience, a front part of the rotation factor 651 will be described. That is, the 1024-point FFT is formed as 10 stages and is repeated for every complex number multiplier 641. In the Radix-$2^2$ SDF structure, one path is provided between each stage, and one complex number multiplication is used for two states such that the number of complex number multiplications is decreased.

When the input data stream is stored at the delay units 621 and 622 and desired input values are inputted at each stage, the first and second butterflies (BF) 611 and 631 perform a BF operation for the input value and values of a feedback register as the delay units 621 and 622. At this time, a part of the BF output is fed back and is stored at the delay units 621 and 622. By increasing the efficiency of the delay units 621 and 622, the size of the memory may be decreased. At this time, control signals 6a) to 6h) are inputted from the controller (not shown).

Referring to FIG. 7, the 1024-point FFT according to an exemplary embodiment of the present invention includes BFs 711 and 731, a complex number multiplier 741, delay units 721 and 722, and a rotation factor 751, and for convenience, a part of the rotation factor 751 is described. That is, the 1024-point FFT is formed as 10 stages and is repeated for every complex number multiplier 751. In the Radix-$2^2$ SDF structure, one path is provided between each stage, and one complex number multiplication is used for two states such that the number of complex number multiplications is decreased.

Comparing FIG. 7 to FIG. 6, control signals 7a) to 7h) may be used through a single path. The FFT unit according to an exemplary embodiment of the present invention requires data path transmission four times faster than that of the previous FFT unit, and a memory size four times as large as that of the previous FFT unit, but has the same structure as that of the previous FFT unit.

That is, when four FFT units are used or one FFT unit arranged in series is used, the memory size may not be changed, but a degree of integration may be decreased and it may use the controller for generating a control signal. Without significantly changing an FFT unit design, four FFT units may be realized as one FFT unit by adding a parallel/series converter and a series/parallel converter.

Figure 8:
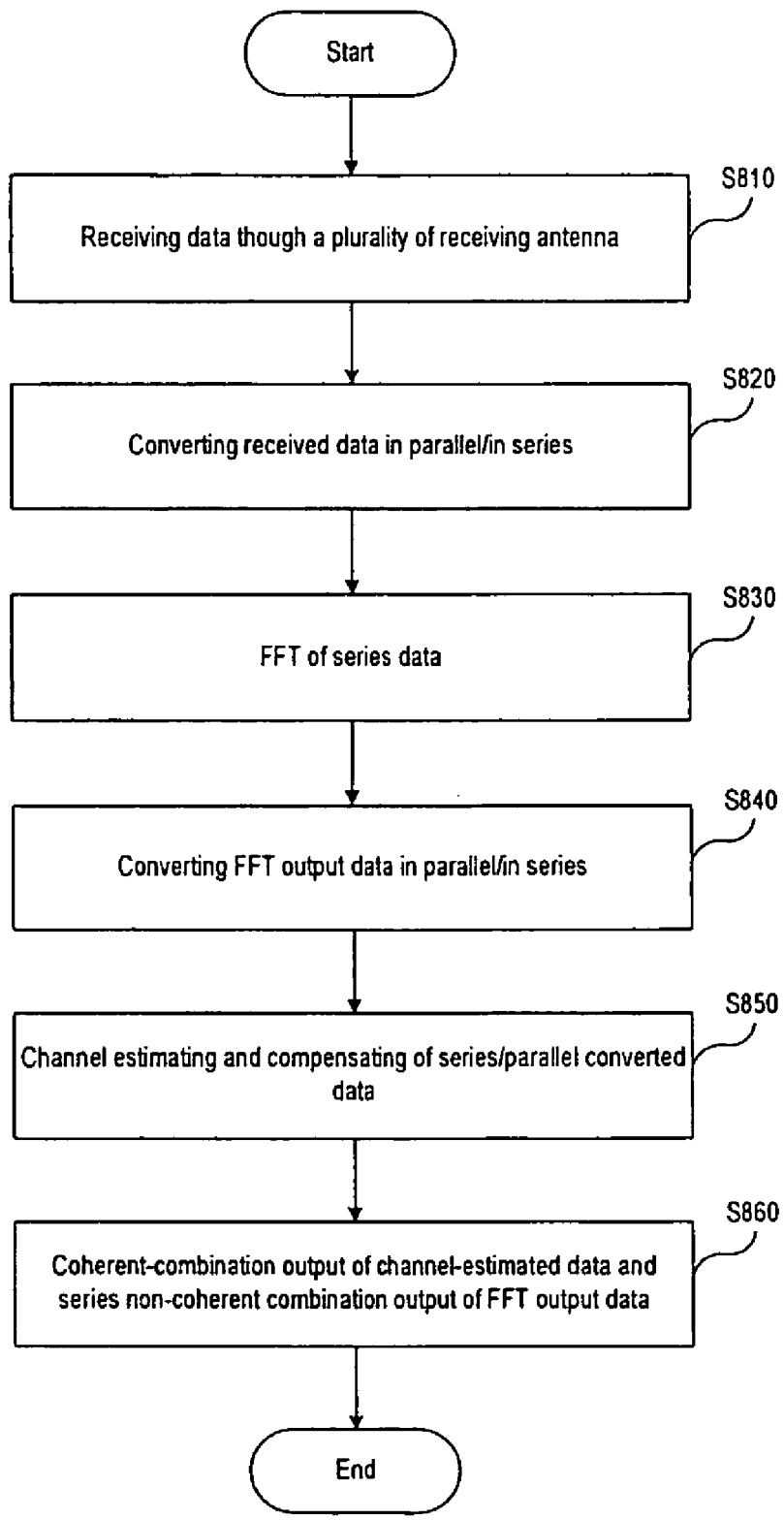
FIG. 8 illustrates a flowchart showing a receiving method of an orthogonal frequency division multiplexing system having multiple antennas according to an exemplary embodiment of the present invention.

FIG. 8 illustrates a flowchart showing a receiving method of an orthogonal frequency division multiplexing system having multiple antennas according to an exemplary embodiment of the present invention.

Referring to FIG. 8, in a receiving method of the OFDMA system having multiple antennas according to an exemplary embodiment, multiple antennas receive data for respective receiving paths (S810).

Each received data is converted from parallel to series data (S820), and the converted data is fast Fourier transformed (S830). The FFT unit has a transmission speed and memory size corresponding to the number of multiple antennas and provides a control signal though the same control path.

The FFT output data is then converted from series to parallel data (S840).

The data converted to parallel data are respectively channel-estimated and compensated for each receiving path (S850).

The channel-estimated and compensated data are coherent-combined and the coherent-combined data are outputted, and the series fast Fourier transformed output data are noncoherent combined and outputted (S860). When noncoherently combining the data in series, one addition unit and one delay unit may be used regardless of the number of multiple antennas.

According to an exemplary embodiment of the present invention, when designing an OFDMA-based receiver having multiple antennas, several FFT units are realized as one FFT unit, and accordingly the complexity may be reduced and the complexity according to the number of antennas may be reduced. In addition, the structure of the noncoherent combiner may be simplified in correspondence with the reduction of the number of FFT units.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The above-described methods and apparatuses are not only realized by the exemplary embodiment of the present invention, but, in addition, are intended to be realized by a program for realizing functions corresponding to the configuration of the exemplary embodiment of the present invention or a recording medium for recording the program.

What is claimed is:

1. A receiving apparatus of a communication system having multiple antennas, the receiving apparatus comprising:
   a parallel/series converter for converting data received according to each receiving path from parallel to series data;
   a fast Fourier transform (FFT) unit for fast Fourier transforming the data converted from parallel to series data;
   a series/parallel converter for converting the fast Fourier transformed series data to parallel data;
   a series noncoherent combiner for noncoherently combining the fast Fourier transformed series data and outputting the noncoherent combined data;
   a channel estimator/compensator for channel-estimating/compensating the data converted to parallel according to the respective receiving paths; and
   a coherent combiner for coherently combining the channel-estimated/compensated data and for outputting the coherent combined data.

2. The receiving apparatus of claim 1, wherein the FFT unit uses a pipeline structure.

3. The receiving apparatus of claim 1, wherein the FFT unit has a transmission speed and a memory size corresponding to the number of multiple antennas.

4. The receiving apparatus of claim 1, wherein the series noncoherent combiner uses one addition unit and one delay unit regardless of the number of the antennas.

5. The receiving apparatus of claim 1, wherein the series noncoherent combiner includes an addition unit for receiving a series input signal as an output of the FFT unit though a first input end and a delay signal through a second input end and adding the same, and outputting the combined output signal; and
   a delay unit for delaying an output of the addition unit according to a parallel sampling signal and inputting the delayed data to the second input end of the addition unit.

6. The receiving apparatus of claim 5, wherein the delay unit is a flip-flop.

7. A receiving method of a communication system having multiple antennas, the receiving method comprising:
   respectively receiving data according to each receiving path though multiple antennas;
   converting each received data from parallel to series data;
   fast Fourier transforming the series-converted data;
   converting the fast Fourier transformed data from series to parallel data;
   channel-estimating and compensating each parallel-converted data according to a receiving path; and
   coherently combining the channel-estimated and compensated data and outputting the coherent-combined data.

8. The receiving method of claim 7, wherein the fast Fourier transformed data has a transmission speed and a memory size corresponding to the number of multiple antennas.

9. The receiving method of claim 7, further comprising noncoherently combining the series fast Fourier transformed data and outputting the noncoherently combined data.

10. The receiving method of claim 9, wherein the noncoherently combining and outputting is performed by one addition unit and one delay unit regardless of the number of multiple antennas.

* * * * *